US009380184B2

(12) United States Patent
Ozawa

(10) Patent No.: US 9,380,184 B2
(45) Date of Patent: Jun. 28, 2016

(54) OPTICAL SCANNING DEVICE AND IMAGE FORMING APPARATUS THEREWITH

(71) Applicant: KYOCERA Document Solutions Inc., Oska (JP)

(72) Inventor: Hiroki Ozawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/947,456

(22) Filed: Nov. 20, 2015

(65) Prior Publication Data
US 2016/0156801 A1 Jun. 2, 2016

(30) Foreign Application Priority Data

Nov. 27, 2014 (JP) ................................. 2014-239653

(51) Int. Cl.
*G03G 15/00* (2006.01)
*H04N 1/113* (2006.01)
*H04N 1/00* (2006.01)
*H04N 1/06* (2006.01)
*G03G 15/043* (2006.01)
*G02B 26/12* (2006.01)

(52) U.S. Cl.
CPC .............. *H04N 1/113* (2013.01); *G02B 26/125* (2013.01); *G03G 15/043* (2013.01); *H04N 1/00554* (2013.01); *H04N 1/06* (2013.01)

(58) Field of Classification Search
CPC .............. G02B 26/125; G03G 15/043; G03G 15/0435; G03G 21/1652; G03G 21/1867; G03G 2215/0132; H04N 1/00551; H04N 1/00909; H04N 1/06
See application file for complete search history.

(56) References Cited

U.S. PATENT DOCUMENTS

| 4,074,217 | A | * | 2/1978 | Yanagawa | G03B 27/522 355/1 |
| 4,885,640 | A | * | 12/1989 | Yoshiura | H04N 1/00519 358/400 |
| 6,029,028 | A | * | 2/2000 | Inoue | B41J 29/12 399/92 |
| 6,965,461 | B1 | * | 11/2005 | Chiang | H04N 1/00352 358/474 |
| 7,352,377 | B2 | * | 4/2008 | Matsutomo | G03G 15/04045 347/134 |
| 7,515,171 | B2 | * | 4/2009 | Lim | G03G 15/04045 347/263 |
| 7,528,855 | B2 | * | 5/2009 | Namba | G03G 15/04072 347/241 |
| 7,853,170 | B2 | * | 12/2010 | Ueda | G03G 21/1842 399/123 |
| 8,089,500 | B2 | * | 1/2012 | Matsuo | G03B 27/72 347/241 |
| 2004/0240905 | A1 | * | 12/2004 | Yamazaki | H04N 1/00909 399/98 |
| 2005/0221907 | A1 | * | 10/2005 | Kato | G02B 26/125 473/257 |
| 2006/0285170 | A1 | * | 12/2006 | Mamiya | B41J 2/471 358/305 |
| 2007/0070173 | A1 | * | 3/2007 | Yamakawa | B41J 2/471 347/241 |
| 2007/0170262 | A1 | * | 7/2007 | Choi | B41J 2/471 235/472.01 |
| 2009/0027735 | A1 | * | 1/2009 | Chun | G03G 15/0435 358/474 |
| 2009/0162117 | A1 | * | 6/2009 | Yamada | G03G 15/326 399/343 |
| 2011/0228028 | A1 | * | 9/2011 | Ohnishi | B41J 2/471 347/118 |
| 2012/0082483 | A1 | * | 4/2012 | Nakatsu | G03G 21/1666 399/177 |
| 2015/0085050 | A1 | * | 3/2015 | Momoka | G03G 15/04045 347/118 |

FOREIGN PATENT DOCUMENTS

JP 2003-307695 A 10/2003

* cited by examiner

*Primary Examiner* — David Bolduc
(74) *Attorney, Agent, or Firm* — Stein IP, LLC

(57) ABSTRACT

An optical scanning device has a rotary multiple-face mirror, a lens, a housing, and a cover member. The housing has a housing space in which the rotary multiple-face mirror and the lens are housed. The cover member covers the housing space in the housing. The housing has a light emission opening through which a light beam is emitted, and outside the light emission opening in the housing, a light transmitting member which transmits the light beam is provided to close the light emission opening. The cover member has a body part which covers the housing space and a fastening part which fastens the light transmitting member by pressing it toward the light emission opening.

8 Claims, 6 Drawing Sheets

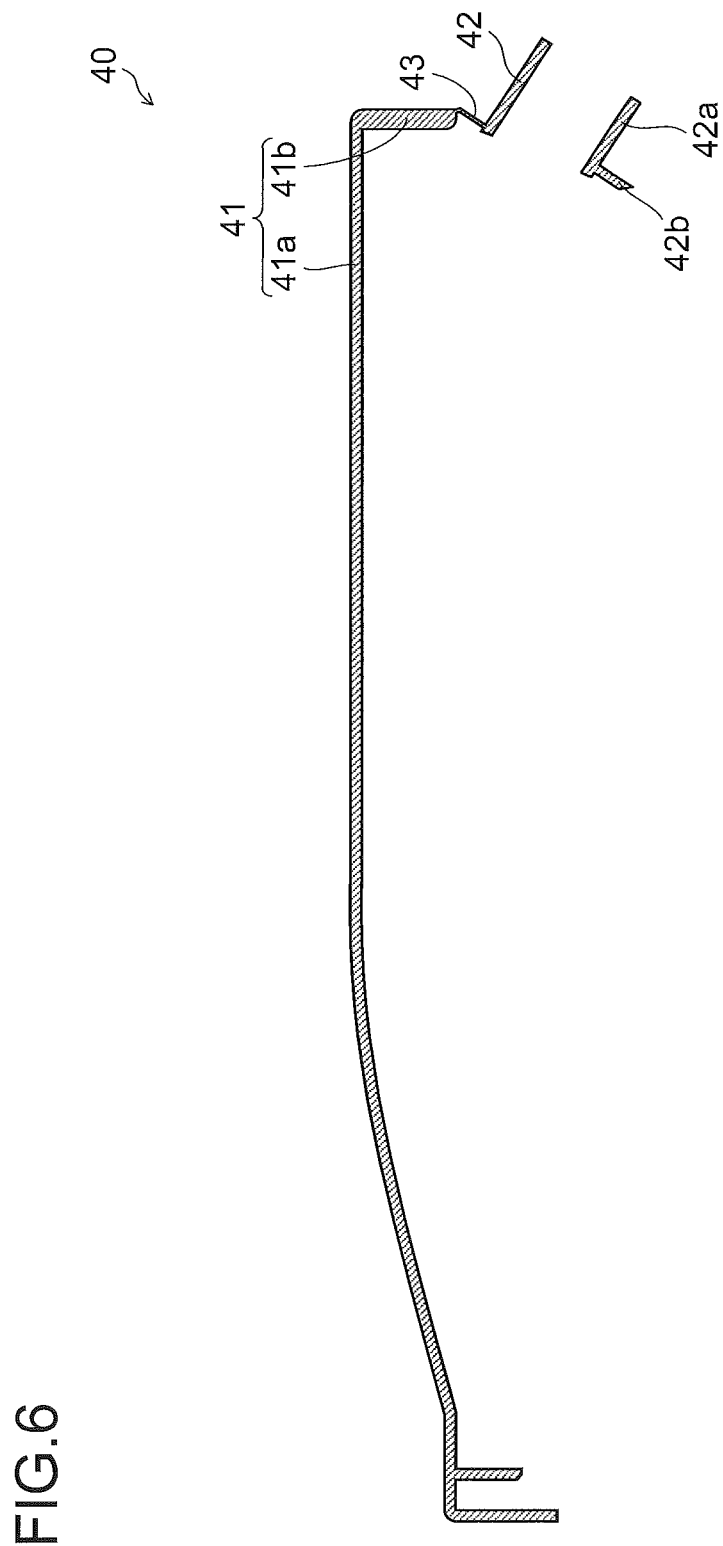

OPTICAL SCANNING DEVICE AND IMAGE FORMING APPARATUS THEREWITH

INCORPORATION BY REFERENCE

This application is based upon and claims the benefit of priority from the corresponding Japanese Patent Application No. 2014-239653 filed on Nov. 27, 2014, the entire contents of which are incorporated herein by reference.

BACKGROUND

The present disclosure relates to optical scanning devices that form a latent image on a surface scanned by exposure to light, and also relates to image forming apparatuses incorporating such optical scanning devices, such as copiers, printers, facsimile machines, and multifunction peripherals having the functions of more than one of those.

An optical scanning device incorporated in copiers, printers, and the like typically includes a light source, a polygon mirror (rotary multiple-face mirror) which achieves scanning by deflecting a light beam from the light source, an fθ lens which focuses the light beam deflected by the polygon mirror on a scanned surface, and a housing to which those components are fastened.

The optical scanning device is extremely sensitive to dust, dirt, and other particulate foreign matter. Dust settled on the fθ lens or the polygon mirror intercepts the light beam and reduces the amount of light, leading to defects in images, such as stripes and uneven density. To avoid that, a housing, a cover member, and the like are used to form a housing space in which to house the polygon mirror and the fθ lens.

In the housing, a light emission opening is formed through which the light beam having traveled from the light source via the polygon mirror and the fθ lens is emitted toward a photosensitive drum. To the housing, a light transmitting member which transmits light is fastened with tape, adhesive, or the like.

SUMMARY

According to one aspect of the present disclosure, an optical scanning device includes a rotary multiple-face mirror, a lens, a housing, and a cover member. The rotary multiple-face mirror performs scanning by deflecting a light beam. The lens focuses the light beam deflected by the rotary multiple-face mirror on a scanned surface. The housing has a housing space in which the rotary multiple-face mirror and the lens are housed. The cover member covers the housing space in the housing. The housing has a light emission opening through which the light beam is emitted, and outside the light emission opening in the housing, a light transmitting member which transmits the light beam is provided so as to close the light emission opening. The cover member has a body part which covers the housing space and a fastening part which is formed integrally with the body part and which fastens the light transmitting member by pressing it toward the light emission opening.

Further features and advantages of the present disclosure will become apparent from the description of embodiments given below.

BRIEF DESCRIPTION OF THE DRAWINGS

FIG. 6 is a sectional view showing a cover member in a state removed from a housing of an optical scanning device according to one embodiment of the present disclosure.

DETAILED DESCRIPTION

Hereinafter, an embodiment of the present disclosure will be described with reference to the accompanying drawings.

Figure 1:
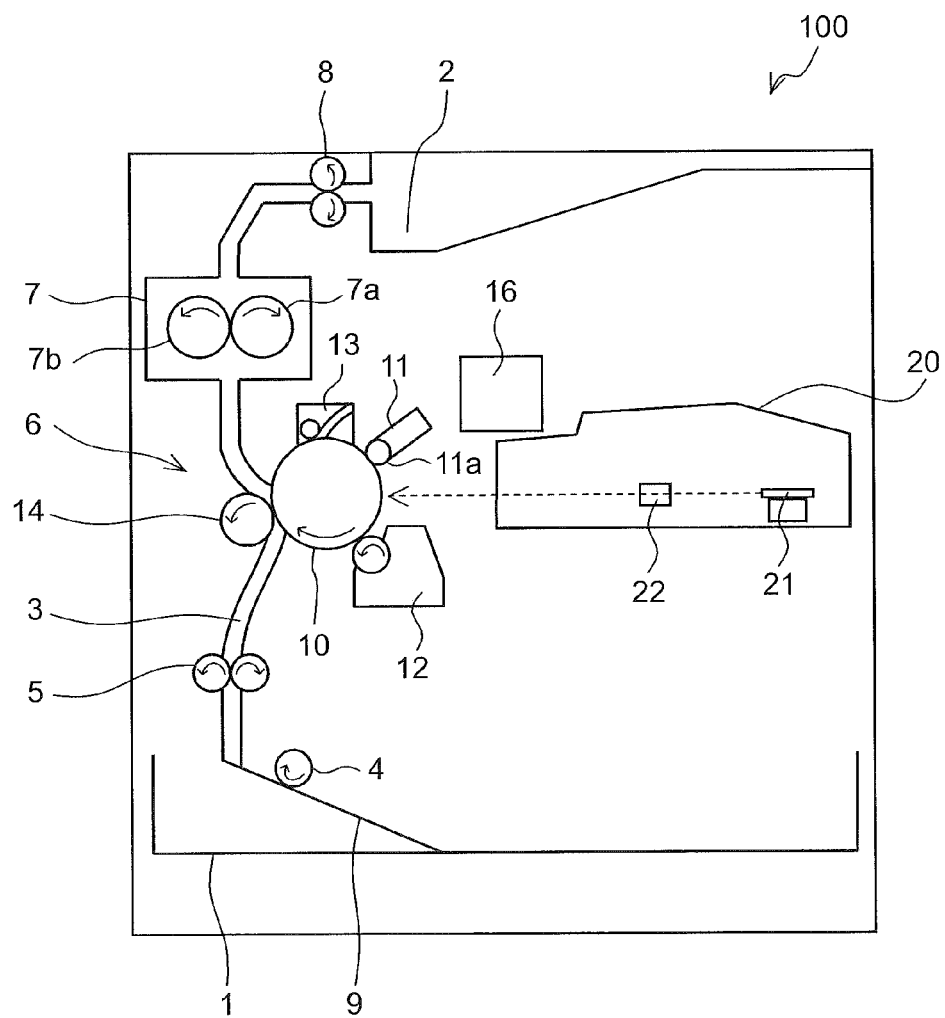
FIG. 1 is a sectional view schematically showing a construction of an image forming apparatus provided with an optical scanning device according to one embodiment of the present disclosure.

With reference to FIGS. 1 to 6, a construction of an image forming apparatus 100 provided with an optical scanning device 20 according to one embodiment of the present disclosure will be described. As shown in FIG. 1, in a lower part of the image forming apparatus 100 (here, a monochrome printer), there is arranged a sheet feed cassette 1 in which stacked sheets are contained. Starting at a rear part of the sheet feed cassette 1, a sheet transport passage 3 is formed which extends upward to reach a sheet discharge portion 2 which is formed in a top face of an apparatus body. Along the sheet transport passage 3, there are arranged, from the upstream side, a pickup roller 4, a registration roller pair 5, an image forming portion 6, a fixing portion 7, and a discharge roller pair 8. The right side of FIG. 1 corresponds to the front side of the image forming apparatus 100.

In the sheet feed cassette 1, a sheet placement plate 9 is provided which is supported so as to be swingable relative to the sheet feed cassette 1. Sheets stacked on the sheet placement plate 9 are fed into the sheet transport passage 3 by the pickup roller 4. A sheet fed into the sheet transport passage 3 is transported to the registration roller pair 5, which then feeds the sheet to the image forming portion 6 with adjusted timing.

The image forming portion 6 forms a predetermined toner image on a sheet by an electrophotographic process. The image forming portion 6 includes the following components: a photosensitive body (image carrying body) 10 which is an image carrying body pivoted so as to be rotatable in the clockwise direction in FIG. 1; a charging device 11, a developing device 12, and a cleaning device 13 arranged around the photosensitive body 10; a transfer roller 14 arranged opposite the photosensitive body 10 across the sheet transport passage 3; and an optical scanning device 20 arranged on the front side of the photosensitive body 10. Above the developing device 12, a toner container 16 is arranged which supplies the developing device 12 with toner.

In the charging device 11, an electrically conductive rubber roller 11a is provided to which an unillustrated electric power source is connected. The electrically conductive rubber roller 11a is arranged so as to abut the photosensitive body 10. As the photosensitive body 10 rotates, the electrically conductive rubber roller 11a follows it to rotate while keeping contact with the surface of the photosensitive body 10; meanwhile, a predetermined voltage is applied to the electrically conductive rubber roller 11a so that the surface of the photosensitive body 10 is electrostatically charged in a uniform fashion.

Then, with a light beam emitted from the optical scanning device 20, an electrostatic latent image based on image data is formed on the photosensitive body 10, and then toner is attached to the electrostatic latent image by the developing device 12, so that a toner image is formed on the surface of the photosensitive body 10. A sheet is then fed, with predetermined timing, from the registration roller pair 5 to a nip portion (transfer position) between the photosensitive body 10 and the transfer roller 14, so that by the transfer roller 14, the toner image on the surface of the photosensitive body 10 is transferred to the sheet.

The sheet having the toner image transferred to it is separated from the photosensitive body 10, and is transported to the fixing portion 7. The fixing portion 7 is arranged on the downstream side of the image forming portion 6 with respect to the sheet transfer direction. The sheet having the toner image transferred to it in the image forming portion 6 is heated and pressed in the fixing portion 7, by a heating roller 7a and a pressing roller 7b provided in it, with the latter in pressed contact with the former, so that the toner image transferred to the sheet is fixed.

The sheet thus having undergone image formation is discharged to the sheet discharge portion 2 by the discharge roller pair 8. On the other hand, the toner left on the surface of the photosensitive body 10 after fixing is removed by the cleaning device 13, and then the photosensitive body 10 is electrostatically charged again by the charging device 11 so that, thereafter, image formation can be continued likewise.

Figure 2:
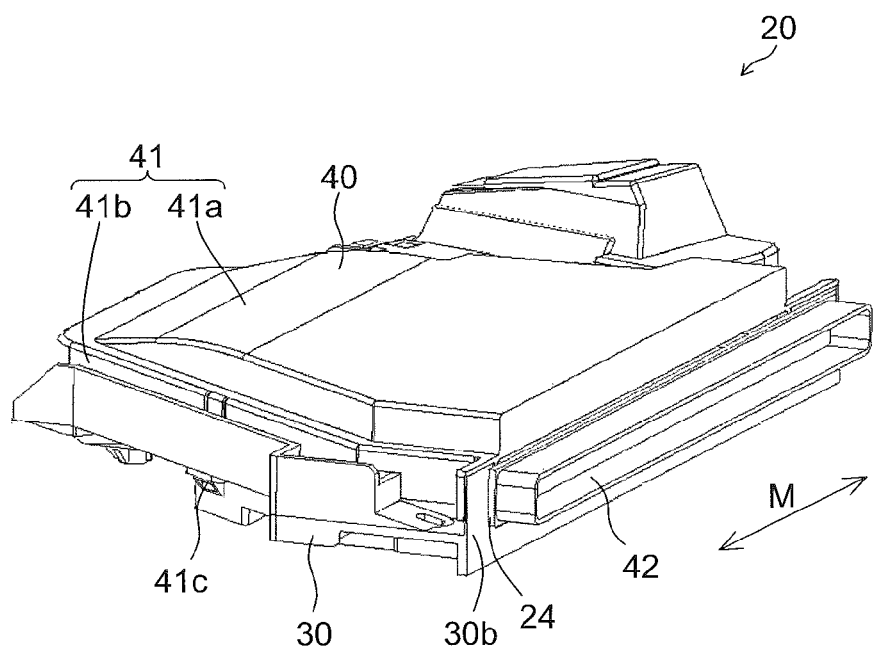
FIG. 2 is a perspective view showing a structure of an optical scanning device according to one embodiment of the present disclosure.
Figure 3:
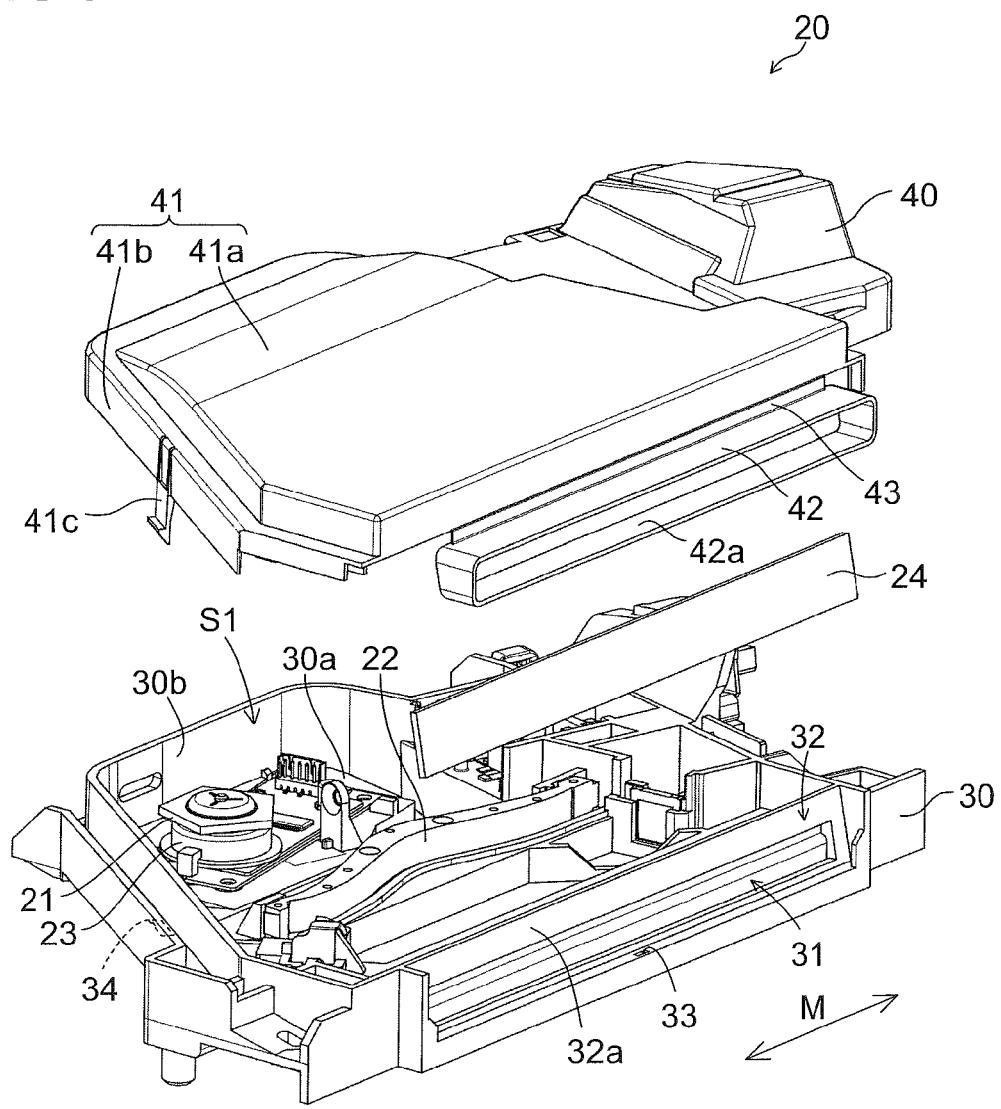
FIG. 3 is an exploded perspective view showing a structure of an optical scanning device according to one embodiment of the present disclosure.

Next, the optical scanning device 20 will be described. As shown in FIGS. 2 and 3, the optical scanning device 20 includes the following components: a light source portion (unillustrated); a polygon mirror 21 which is a rotary multiple-face mirror; a scanning optical system (lens) 22; a housing 30 in which those components are housed; and a cover member 40 which covers the top of the housing 30. FIGS. 2 to 6 are views from the rear side of what is shown in FIG. 1: the right and left sides in FIGS. 2 to 6 are the other way around compared with those in FIG. 1.

The light source portion includes a light source, such as a laser diode, which outputs laser light, and a cylindrical lens, a collimating lens, and the like for defining the cross-sectional shape of the laser light. The light source portion emits a light beam modulated according to image data fed in from an unillustrated personal computer or the like.

The polygon mirror 21 is rotated at a predetermined speed by a polygon motor 23, and deflects the light beam emitted from the light source portion so as to perform scanning in a main scanning direction M.

The scanning optical system 22 includes one or more lenses, and refracts the light beam reflected from the polygon mirror 21 so that scanning is performed at a constant speed in the main scanning direction M, while focusing the light beam on the scanned surface. In this embodiment, the scanning optical system 22 include one fθ lens.

With the above configuration, the light source portion emits a light beam modulated according to image data toward the polygon mirror 21. The polygon mirror 21, while rotating, reflects the light beam emitted from the light source portion so as to achieve scanning by deflection. The scanning optical system 22 converts the light beam reflected from the polygon mirror 21 such that scanning is performed at a constant speed, and focuses it on the scanned surface, i.e., the surface of the photosensitive body 10 (see FIG. 1). In this way, the optical scanning device 20 scans the photosensitive body 10 over a predetermined range in the main scanning direction M, thereby to form an electrostatic latent image on the photosensitive body 10.

The housing 30 has a bottom part 30a, to which the polygon mirror 21, the scanning optical system 22, etc. are fastened, and a side wall part 30b, which rises from an edge part of the bottom part 30a. The bottom part 30a and the side wall part 30b form a housing space S1 in which the polygon mirror 21, the scanning optical system 22, etc. are housed.

Figure 4:
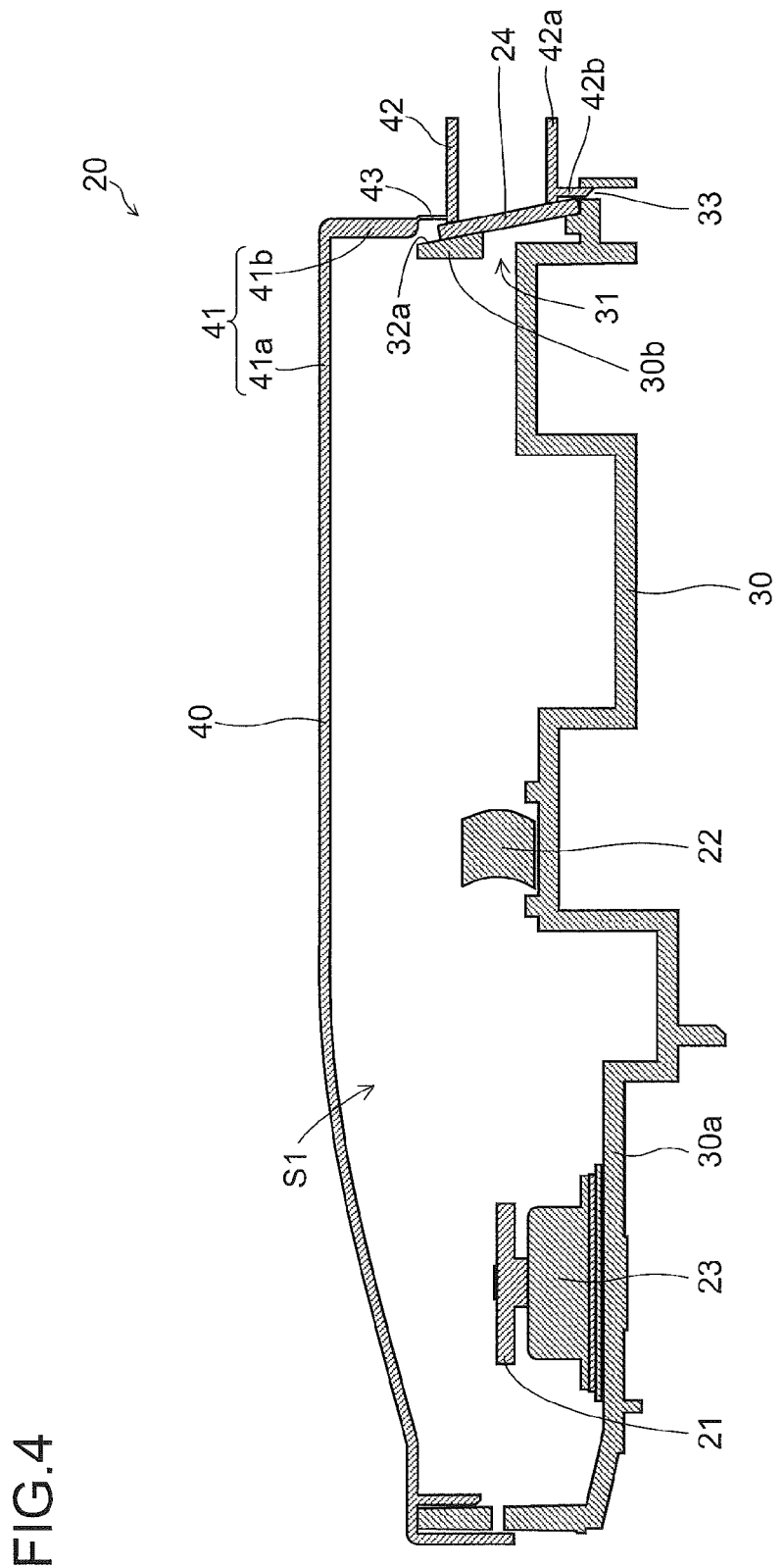
FIG. 4 is a sectional view showing a structure of an optical scanning device according to one embodiment of the present disclosure.

As shown in FIGS. 3 and 4, in the side wall part 30b of the housing 30, a light emission opening 31 is formed through which the light beam from the scanning optical system 22 is directed to the photosensitive body 10 (see FIG. 1). The light emission opening 31 is an opening that extends in the main scanning direction M.

Outside the light emission opening 31 in the housing 30, a light transmitting member 24 formed of a transparent plate of glass so as to transmit light is fastened so as to close the light emission opening 31. This prevents entry of dust and the like into the housing space S1 through the light emission opening 31.

As shown in FIG. 3, outside the light emission opening 31 in the housing 30, an insertion part 32 is formed in which the light transmitting member 24 is inserted from above. The insertion part 32 has an inner side face 32a and an outer side face 32b (see FIG. 5) which are located opposite each other in the thickness direction of the insertion part 32 (the left/right direction in FIG. 4).

Figure 5:
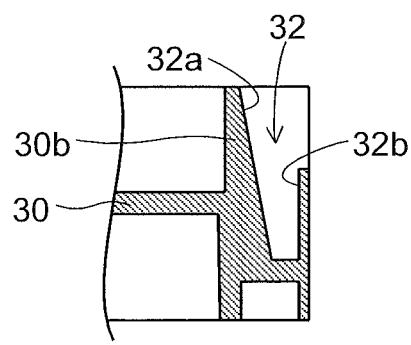
FIG. 5 is a sectional view showing a structure of one end part, with respect to the main scanning direction, of an insertion part of an optical scanning device according to one embodiment of the present disclosure.

The light transmitting member 24 is arranged in contact with the inner side face 32a. The outer side face 32b is divided in two parts located at opposite sides in the main scanning direction M. As shown in FIG. 5, the inner side face 32a and the outer side face 32b are formed to define a tapered shape with an increasingly narrow width downward (in the direction in which the light transmitting member 24 is inserted).

As shown in FIG. 3, around a central part of the light emission opening 31 in the housing 30 in the main scanning direction M, an engagement hole 33 is formed in which an engagement part 42b, described later, provided on the cover member 40 is inserted.

The cover member 40 has a body part 41, which covers the housing space Si, and a fastening part 42, which is formed integrally with the body part 41.

The body part 41 has a top face part 41a, which covers the top of the housing space S1, and a side wall part 41 b, which rises from the top face part 41 a so as to surround the housing space S1. On the side wall part 41b, one or more fastening parts 41c (see FIG. 3), such as snap-fit claws, are provided so as to protrude downward. In the housing 30, at positions corresponding to the fastening parts 41c on the cover member 40, fastening holes 34 (see FIG. 3) are formed in which the fastening parts 41c are inserted to achieve fastening. When the cover member 40 is fitted to the housing 30 from above, the fastening parts 41c on the cover member 40 are inserted in and engage with the fastening holes 34, and thereby the cover member 40 is fastened to the housing 30.

The fastening part 42 fastens the light transmitting member 24 by pressing it toward the light emission opening 31. Specifically, the fastening part 42 is formed on the side wall part 41b of the body part 41 via a hinge part 43 which is elastically deformable. The fastening part 42 is formed in the shape of a frame along an edge part of the light transmitting member 24, and includes a frame-shaped windproof wall part 42a which protrudes outward (to the side opposite from the light transmitting member 24).

As shown in FIG. 6, with the cover member 40 removed from the housing 30, the fastening part 42 is located closer to the body part 41 than with the cover member 40 fitted to the housing 30 (the state shown in FIG. 4). Thus, with the cover member 40 fitted to the housing 30, the resilient force of the hinge part 43 keeps the fastening part 42 pressed toward the light emission opening 31. The hinge part 43 is formed with a smaller thickness than the fastening part 42 and the side wall part 41b.

On a bottom face of a central part of the fastening part 42 in the main scanning direction M, an engagement part 42b is formed which protrudes downward. As shown in FIG. 4, as a result of the engagement part 42b on the fastening part 42 being inserted in the engagement hole 33 in the housing 30, the fastening part 42 can press the light transmitting member 24 with a stronger force, and the fastening part 42 can easily be prevented from coming off the light transmitting member 24. The direction (downward direction) in which the engagement part 42b is inserted in the engagement hole 33 is the same as the direction (downward direction) in which the cover member 40 is fitted to the housing 30.

In this optical scanning device 20, when the cover member 40 is fitted to the housing 30, as the cover member 40 is moved down toward the housing 30, the fastening parts 41c on the cover member 40 are inserted in the fastening holes 34 in the housing 30, thereby achieving fastening. Meanwhile, the fastening part 42 moves downward while pressing the light transmitting member 24 toward the light emission opening 31, and the engagement part 42b on the fastening part 42 is inserted in the engagement hole 33 in the housing 30. In this way, at the same time that the cover member 40 is fitted to the housing 30, the engagement part 42b on the fastening part 42 is inserted in the engagement hole 33 in the housing 30, and thereby the light transmitting member 24 is fastened to the housing 30.

In this embodiment, as described above, the cover member 40 has the fastening part 42 which fastens the light transmitting member 24 by pressing it toward the light emission opening 31 in the housing 30. Thus, with part (fastening part 42) of the cover member 40, the light transmitting member 24 can be fastened to the housing 30, and this helps suppress an increase in the number of components of the optical scanning device 20.

Moreover, as described above, between the body part 41 and the fastening part 42, the hinge part 43 is provided. Thus, the fastening part 42 can be bent at the hinge part 43, and this makes it easy to press the light transmitting member 24 with the fastening part 42.

Moreover, as described above, with the cover member 40 removed from the housing 30, the fastening part 42 is located closer to the body part 41 than with the cover member 40 fitted to the housing 30. Thus, with the cover member 40 fitted to the housing 30, the hinge part 43 is elastically deformed such that the fastening part 42 is located further out. Thus, with the resilient force of the hinge part 43, the fastening part 42 can easily be pressed toward the light transmitting member 24.

Moreover, as described above, the hinge part 43 has a smaller thickness than the fastening part 42. Thus, the hinge part 43 can easily be deformed elastically.

Moreover, as described above, the fastening part 42 includes the frame-shaped windproof wall part 42a. Thus, the light transmitting member 24 is prevented from being hit by a current of air from outside the optical scanning device 20, and this helps prevent dust and the like from settling on the light transmitting member 24. It is thus possible to suppress defects in images resulting from dust intercepting the light beam.

Moreover, as described above, the inner side face 32a and the outer side face 32b of the insertion part 32 are formed to define a tapered shape with an increasingly narrow width in the direction in which the light transmitting member 24 is inserted (downward). This gives the insertion part 32 a wider top opening, making it easy to insert the light transmitting member 24 in the insertion part 32.

Moreover, as described above, the direction (downward direction) in which the cover member 40 is fitted to the housing 30 is the same as the direction (downward direction) in which the engagement part 42b is inserted in the engagement hole 33. Thus, at the same time that the cover member 40 is fitted to the housing 30, the engagement part 42b is inserted in the engagement hole 33 so that the light transmitting member 24 is fastened by the fastening part 42. This helps suppress an increase in the number of steps needed in the assembly of the optical scanning device 20.

The embodiment described above should be understood to be in every aspect merely illustrative and not restrictive. The scope of the present disclosure is defined not by the description of the embodiment given above but by the appended claims, and encompasses any modifications and variations made in the spirit and scope equivalent to those of the appended claims.

For example, although the embodiment deals with an example where the present disclosure is applied to a monochrome printer as shown in FIG. 1, this is not meant to limit the application of the present disclosure. Needless to say, the present disclosure find applications in a variety of image forming apparatuses, such as color printers, color copiers, monochrome copiers, digital multifunction peripherals, and facsimile machines, that are provided with an optical scanning device which forms a latent image on a surface scanned by exposure to light.

Although the above embodiment deals with an example where the light beam having been transmitted through the scanning optical system (lens) 22 emerges to the outside via the light emission opening 31 without being reflected on a mirror, this is not meant to limit the present disclosure. There can be provided one or more turning mirrors that turn back the light beam having been transmitted through the scanning optical system (lens) 22 to direct it to the photosensitive body (image carrying body) 10.

What is claimed is:

1. An optical scanning device comprising:
a rotary multiple-face mirror which performs scanning by deflecting a light beam;
a lens which focuses the light beam deflected by the rotary multiple-face mirror on a scanned surface;
a housing which has a housing space in which the rotary multiple-face mirror and the lens are housed; and
a cover member which covers the housing space in the housing,
wherein
the housing has a light emission opening through which the light beam is emitted,
outside the light emission opening in the housing, a light transmitting member which transmits the light beam is provided so as to close the light emission opening,
the cover member has
a body part which covers the housing space and
a fastening part which is formed integrally with the body part and which fastens the light transmitting member by pressing the light transmitting member toward the light emission opening.

2. The optical scanning device of claim 1, wherein a hinge part is provided between the body part and the fastening part.

3. The optical scanning device of claim 2, wherein
the body part has a side wall part which surrounds the housing space,
the fastening part is formed on the side wall part via the hinge part, and with the cover member removed from the housing, the fastening part is located closer to the body part than with the cover member filled to the housing.

4. The optical scanning device of claim 2, wherein the hinge part has a smaller thickness than the fastening part.

5. The optical scanning device of claim 1, wherein the fastening part is formed in a shape of a frame along an edge part of the light transmitting member, and the fastening part includes a windproof part in a shape of a frame which protrudes to a side opposite from the light transmitting member.

6. The optical scanning device of claim 1, wherein in the housing, an insertion part is formed in which the light transmitting member is inserted, the insertion part has an inner side face and an outer side face which are located opposite each other in a thickness direction of the light transmitting member, and the inner side face and the outer side face are formed to define a tapered shape having an increasingly narrow width in a direction in which the light transmitting member is inserted.

7. The optical scanning device of claim 1, wherein the fastening part has an engagement part which engages with the housing, the housing has an engagement hole in which the engagement part on the fastening part is inserted, and a direction in which the cover member is fitted to the housing is same as a direction in which the engagement part is inserted in the engagement hole.

8. An image forming apparatus comprising:

the optical scanning device of claim 1; and an image carrying body on which an electrostatic latent image is formed by the light beam emitted from the light emission opening of the optical scanning device.

\* \* \* \* \*